United States Patent
Okoshi

(10) Patent No.: US 6,482,121 B2
(45) Date of Patent: Nov. 19, 2002

(54) PARALLEL DUAL SHAFT DRIVE APPARATUS

(75) Inventor: Hideo Okoshi, Kanagawa-ken (JP)

(73) Assignees: Hideo Okoshi, Kanagawa-ken (JP); Mikuni Sogyo Company, Tokyo (JP)

( * ) Notice: Subject to any disclaimer, the term of this patent is extended or adjusted under 35 U.S.C. 154(b) by 0 days.

(21) Appl. No.: 09/902,611

(22) Filed: Jul. 12, 2001

(65) Prior Publication Data

US 2002/0022546 A1 Feb. 21, 2002

(30) Foreign Application Priority Data

Jul. 12, 2000 (JP) .................................. 2000-246524

(51) Int. Cl.7 .................. F16H 13/06; B62M 13/00; B62M 23/00
(52) U.S. Cl. ........................ 476/65; 476/67; 180/221
(58) Field of Search ..................... 476/31, 61, 65, 476/66, 67; 180/221

(56) References Cited

U.S. PATENT DOCUMENTS 1,870,421 A * 8/1932 Prout .......................... 476/66
5,413,265 A * 5/1995 Stahl et al. ................. 226/188

FOREIGN PATENT DOCUMENTS

| DE | 196 33 345 A | * | 2/1998 |
| JP | U 7-6079 | | 1/1995 |
| JP | U 7-19090 | | 4/1995 |
| JP | A 2002-31202 | | 1/2002 |

* cited by examiner

Primary Examiner—William C Joyce
(74) Attorney, Agent, or Firm—Young & Thompson

(57) ABSTRACT

A drive arrangement clamps an output disc such as a tire with two driving rollers so as to drive the output disc. The drive arrangement is compact, light-weight, low-noise and inexpensive, and can be used for a bicycle equipped with an electrical assist drive or various kinds of welfare-specific vehicles. The drive apparatus includes an input shaft and two output shafts extending in a single plane in parallel to each other. The input shaft has an input roller, and each of the output shafts has an output roller. A loading roller is located between the input roller and one of the output rollers, and an axis of the loading roller is slightly spaced from the plane of the two output shafts. An outer peripheral surface of each roller is a substantially cylindrical rolling surface. The loading roller is preloaded by a preload spring such that it squeezes between the input roller and one of the output rollers. A friction force generated on the rolling surface by a torque exerted on the input roller pushes in the loading roller between the rolling surfaces of the input roller and one of the output rollers so that a large normal force is produced between the rolling surfaces. A friction force at the rolling surface transmits the torque of the input shaft to the two output shafts.

6 Claims, 6 Drawing Sheets

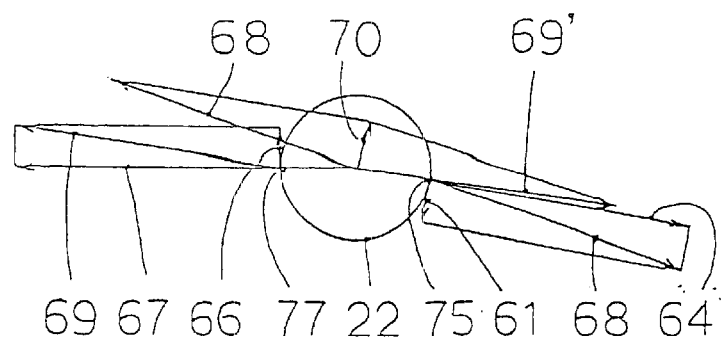
F I G. 6
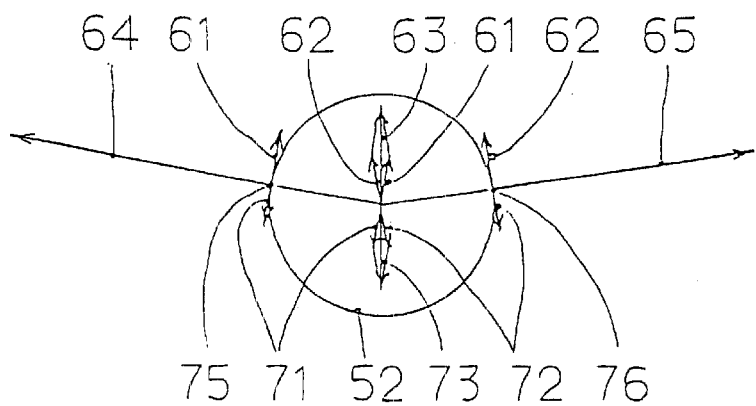
F I G. 7
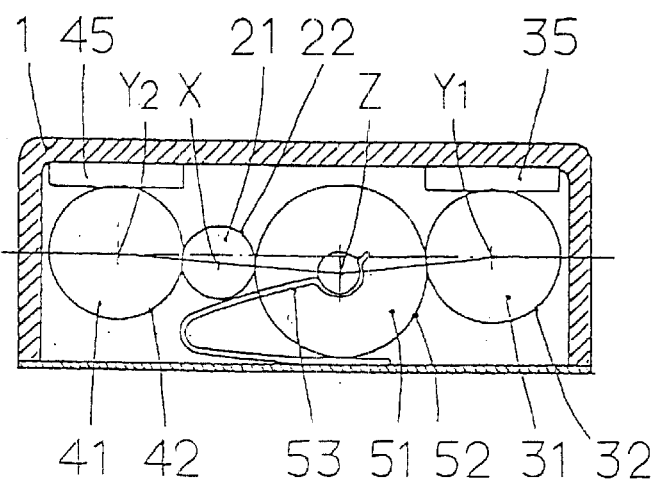
F I G. 8

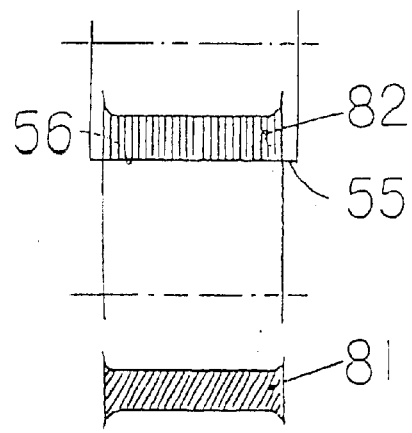
F I G. 1 2
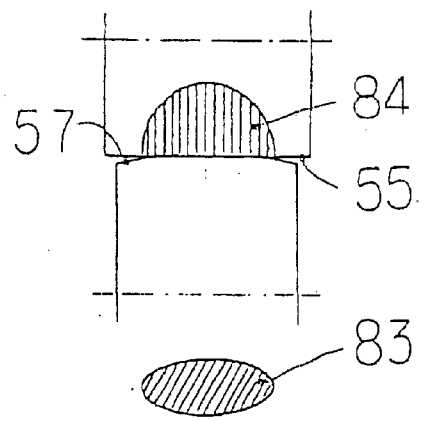
F I G. 1 3
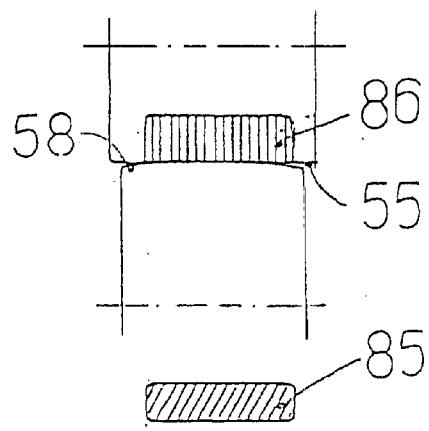
F I G. 1 4

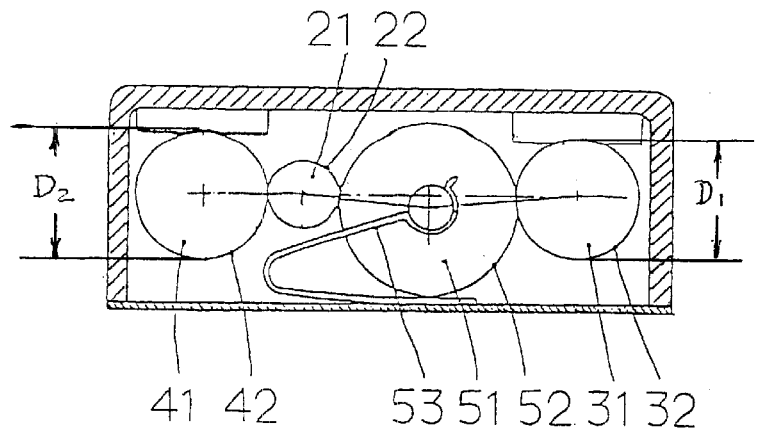
F I G. 15
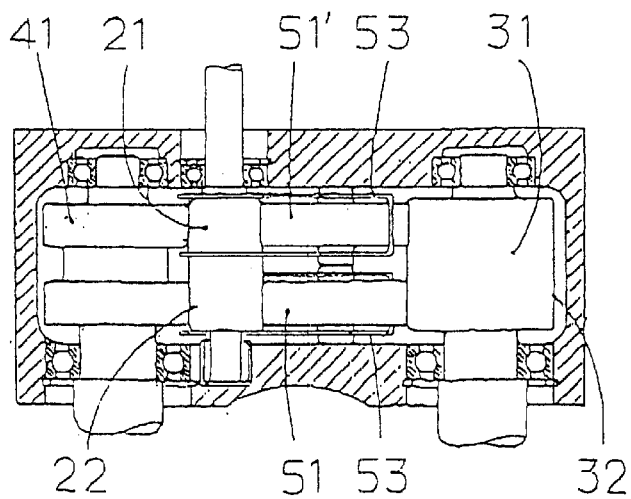
F I G. 16
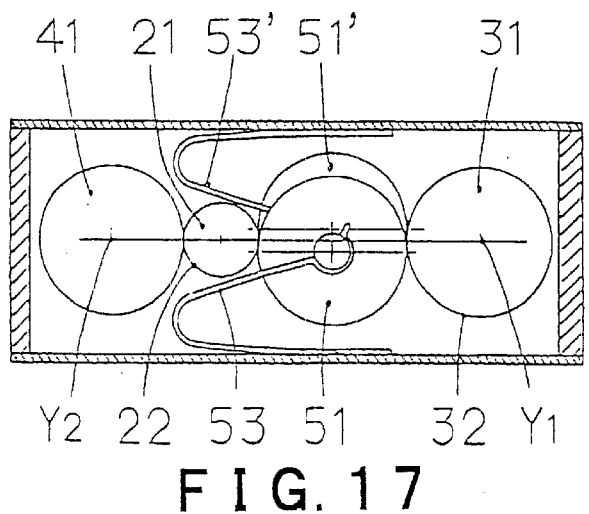
F I G. 17

PARALLEL DUAL SHAFT DRIVE APPARATUS

BACKGROUND OF THE INVENTION

1. Field of the Invention

The present invention relates to a drive apparatus for clamping a tire or an output disc of a bicycle equipped with an electric assist or of various small motor vehicles such as a welfare-specific vehicle at an outer periphery of the tire (or output disc) from both sides of the tire (or output disc) in an axial direction of thereof to drive the tire (or output disc) with a friction force.

2. Description of the Related Art

A drive apparatus employed as electric assist in a bicycle or the like often possesses a mechanism for reducing a rotation speed of a high speed motor with a gear train (or gear units) or a friction-driven planetary roller speed-reduction device to directly drive an axle of wheels or indirectly drive the axle via chains or belts.

Such drive apparatus reduces the rotation speed of the motor (several-thousand revolutions per minute) to or less than twentieth to ninetieth (two-hundred revolutions per minute at maximum) so as to obtain a large torque and drive the wheel axle. In order to achieve a large speed reduction ratio, the speed reduction device has to have a large dimension. Further, the drive apparatus should be rigid to bear great forces imposed on various parts thereof upon speed reduction. This often results in not only an increased weight of the drive apparatus but also additional reinforcement required to a bicycle body for supporting the large forces.

Since the bicycle requires drive power sufficient for its weight increased due to the motor, the speed-reduction device, the battery and the body reinforcement parts, the total weight of the bicycle is further increased. As a result, a common bicycle equipped with an electrically assisting device (drive apparatus) is almost twice as heavy as an ordinary bicycle without the electrically assisting device, and its cost is greatly raised.

In order to avoid such great increase in the weight and cost, portions to be driven should be limited to those having a large diameter such as the tire, rim or nearby spokes. By doing so, a speed-reduction device of large reduction ratio is not needed, the bicycle only requires a small reduction ratio to drive itself, and forces acting on various parts are reduced so that no reinforcement is required to the body. Accordingly, the drive apparatus including the drive mechanism can be designed to be compact and light-weight. A low cost drive apparatus that can be attached to the common existing bicycle is therefore obtainable.

To such an end, some bicycles are provided with a drive apparatus of which driving roller is forced against an outer diameter surface of a tire and rotated so as to drive the wheel with a friction force generated between the driving roller and the tire outer diameter surface.

If the drive apparatus drives the wheel with the friction force of the driving roller in contact with the outer diameter surface of the tire, it is necessary to apply a large presser force having a certain margin in order to prevent a slip from occurring between the drive surface of the driving roller and the outer diameter surface of the tire in spite of weather conditions such as rain that makes the road and tire slippery, adhesion of ground, sand and mud, and mechanical factors such as tire air pressure drop, tire wear, axle eccentricity, vehicle body deformation and wheel deformation. Since a large contact area should be insured to maintain a contact force between the driving roller and the tire, and the biting of the driving roller into the tire should be reduced, the driving roller has to have a relatively large diameter.

However, when the bicycle sticks in the mud, for example, a large amount of mud adhering to the tire outer diameter surface is not easy to spin off during the riding. Thus, a slip occurs between the tire and the driving roller and the tire is locally worn. This can disable further movement of the bicycle.

In order to compensate for the drop in the driving force due to the adhesion of the mud, the driving roller should be pressed against the tire with a still greater force. However, it results in the reduced life of the tire because application of the large force and deformation are repeated.

It is necessary to employ a driving roller of larger diameter and enlarge a contact area between the tire and the driving roller in order to reduce the deformation caused by the large presser force. This inevitably makes the rotation speed of the driving roller slower. In other words, the rotation speed of the motor is greatly reduced and the driving roller is driven by such a motor.

Gears or belts are often utilized to reduce the motor rotation speed considerably. However, if a smaller gear or pulley has a very small diameter, duration drops and therefore extremely small diameter cannot be adopted. Accordingly, a large gear or pulley has to have a large diameter if a reduction ratio is large. This makes it difficult to attach the drive apparatus to the bicycle since a limited space is only available. Consequently, a large reduction ratio cannot be expected, and a low speed motor has to be selected.

In general, a motor can be made compact if it is designed to rotate faster and to demonstrate the same output. Thus, use of a low speed motor is disadvantageous because the size, weight and cost of the motor increase.

The above described drive apparatus that drives the outer diameter surface of the tire therefore has a large size, and is particularly difficult to mount on a bicycle since the installation space for the drive apparatus is limited.

If the tire is held between the two drive rollers that are rotated in opposite directions to drive lateral surfaces of the tire with friction forces, the number of points of drive becomes two so that the drive force is dispersed. Since the lateral surfaces of the tire are less affected by the mud as compared with the outer diameter surface, the drive roller can have a smaller diameter and the drive motor of higher rotation speed can be employed as compared with an arrangement that drives the tire at the outer diameter surface. This is advantageous in terms of size reduction of the drive apparatus.

A common approach to rotate the two driving rollers in opposite directions relative to each other is as follows: two spur gears having the same number of teeth are coaxially provided on the two driving rollers respectively such that they mesh with each other, and one of the gears is driven by a motor. Therefore, each of these spur gears has a pitch circle diameter which has the same value as a distance between axes of the two driving rollers. Thus, the spur gear has a larger diameter than the driving roller and a casing for housing these gears becomes large.

If the two spur gears have a smaller diameter and two intermediate (or loading) gears are located between the spur gears, the size of the casing may be reduced. However, a cost will be raised since bearings for supporting two shafts of the intermediate gears are additionally provided. Further, a larger load is exerted on the teeth as the gear diameter is reduced. Gears used in an inexpensive mechanism such as the electric drive apparatus attached to the bicycle are generally made from plastic. Therefore, the smaller gears may jeopardize strength reliability; use of the small gears is not practical. In sum, a compact gear casing cannot be realized so that the drive apparatus cannot be mounted on the bicycle, and drive power loss is increased due to the increased load acting on the tooth surfaces and the increased points of gear engagement from one to three, and noises are also increased for the same reason.

Further, the drive mechanism employing the plastic gears cannot have sufficient accuracy in the gears and the teeth greatly deform elastically so that increased noises and torque irregularity upon gear meshing are unavoidable.

Moreover, when the bicycle equipped with the electrical drive apparatus runs by its inertia without being assisted by the associated motor, the motor becomes a brake to hinder the bicycle's coasting as the motor is driven by the wheel. When the bicycle is pushed by hands, the wheel drives the motor so that the bicycle becomes heavy to push. In order to eliminate these inconveniences, one approach may be provision of a one-way clutch between the motor and the drive apparatus. This, however, makes the structure complicated and augments the size, weight and cost.

As described above, the drive apparatus according to the prior art that friction-drives the outer diameter surface of the tire with a friction force between the driving rollers and the tire requires the large diameter driving rollers and the low speed motor to prevent slip between the tire and driving rollers and reduction of life of the tire due to excessive deformations. Thus, the drive apparatus has to have a large dimension, heavy weight and increased cost, and is difficult to mount on the bicycle.

If the drive apparatus is designed to clamp the output disc such as a tire by the two driving rollers and drive the tire with a friction force, and the two driving rollers are adapted to rotate in opposite directions upon engagement of the two spur gears coaxially attached to the driving rollers, then the gears inevitably generate noises and have a large diameter so that the casing for the gears becomes large, the drive apparatus becomes heavy, the cost is raised and the installation onto the bicycle becomes difficult.

Even if the two spur gears have a smaller diameter, and two idler gears are located between the two spur gears, bearings for supporting shafts of these idler gears must be provided. In this case, the distance between the gear centers cannot be reduced since the outer diameters of the bearing interfere with each other. Further, the gears cannot have a small diameter since they should have sufficient strength. Therefore, the size reduction of the gear casing is limited, the weight and cost are raised, and the installation onto the bicycle is hardly improved.

SUMMARY OF THE INVENTION

A primary object of the present invention is to provide a drive apparatus that can eliminate the above described problems, i.e., the drive apparatus that has a smaller casing, a reduced weight, is easy to mount on a bicycle, and has a reduced cost.

In the arrangement adapted to cause the two driving rollers to rotate in opposite directions upon engagement of the associated gears, the slip friction loss due to the gear engagement results in deterioration of the power transfer efficiency. This is particularly significant when the inexpensive plastic gears are used. A second object of the present invention is to provide a drive apparatus that can reduce the friction loss caused during power transfer, and has a high power transfer efficiency.

A creep ratio of a tooth surface upon gear engagement is as large as 10% to 20%. The lubricating oil is repeatedly subjected to shearing because of this creep so that the lubricating oil is eventually deteriorated. It is therefore necessary to sufficiently supply a lubricating oil to the gears to reduce frictions and prevent gear surface wear. Further, a sufficient amount of lubricating oil should be sealed inside the gear casing to reduce the influence of deteriorated lubricating oil.

As a large quantity of lubricating oil is sealed, the volume of the air inside the casing decreases. When the casing temperature rises due to heat generation of the gears, atmosphere temperature rise and sunshine, thermal expansion of the lubricating oil and air raises the pressure in the casing and troubles such as oil leakage tend to happen. A third object of the present invention is to reduce an amount of lubricating oil used in the drive apparatus so as to eliminate drawbacks such as oil leakage.

The arrangement that has gears generates noises upon engagement of the gears. Particularly, high accuracy cannot be expected in the plastic gears of low price. Even if a vibration damping effect of the plastic is taken into account, a problem of noises still remains. A fourth object of the present invention is to reduce noises upon drive power transfer.

The arrangement having the gears cannot have small gears since the strength of the gears and the dimensions of the bearings provided to support the gears impose limitations. Thus, a small motor that is able to rotate at a high speed cannot be employed. Accordingly, the motor size reduction, weight reduction and cost reduction are difficult. A fifth object of the present invention is to provide a light-weight, inexpensive, highly reliable and durable drive apparatus that does not suffer from limitations imposed by the gear dimension and can use a small, light-weight and high speed motor.

A sixth object of the present invention is to eliminate necessity of a one-way clutch that prevents bicycle's coasting from being reduced due to the wheel's driving the motor during the coasting or bicycle hand-pushing and that prevents the bicycle from becoming heavy to push, and to provide a drive apparatus itself with a function of a one-way clutch.

In case of a welfare-specific vehicle such as an electrically driven wheel chair, on the contrary, the function of the one-way clutch is not needed; both forward and backward movements should be made with the electrical device. A seventh object of the present invention is to cope with such a demand, i.e., to transmit the torque in both directions without adversely influencing other functions.

The present invention is developed in view of the above described background, and its object is to provide a parallel dual-shaft drive apparatus that employs a high speed, small and high output motor, generates less noises, has a high power transfer efficiency, possesses a function of a one-way clutch, which is eliminated upon a demand to enable torque transmission in both directions, has high reliability, is small, has a reduced weight, is easy to manufacture, is easy to mount on a vehicle, is easy to maintain, is inexpensive, and can be utilized as an electrical assisting device to drive lateral surfaces of a tire of a bicycle with a friction force when mounted on the bicycle.

According to one aspect of the present invention, there is provided a parallel dual-shaft drive apparatus comprising: a single casing; a single input shaft supported by bearings in the casing and having an axis X and an input roller, an outer peripheral surface of the input roller being a substantially cylindrical rolling surface; first and second output shafts supported by bearings in the same casing and having axes Y1 and Y2 and first and second output rollers respectively such that the output shafts and input shaft extend in a substantially same plane, the second output roller is positioned adjacent to the input roller, an outer peripheral surface of each output roller is defined by a substantially cylindrical rolling surface, and the rolling surface of the second output roller is in rolling-contact with the rolling surface of the input roller; and a loading roller extending between the input roller and the first output roller such that a center axis Z of the loading roller is slightly spaced from a plane including the axes Y1 and Y2 of the first and second output shafts and extends in parallel to the input shaft axis X and the output shaft axes Y1 and Y2, an outer peripheral surface of the loading roller is defined by a substantially cylindrical rolling surface, the rolling surface of the loading roller is in rolling-contact with the rolling surface of the input roller and the rolling surface of the first output roller, and the loading roller is supported by support means inside the casing and preloaded by a preload spring which causes the loading roller to squeeze between the rolling surface of the input roller and the rolling surface of the first output roller.

As the input shaft rotates, the second output roller and the loading roller in contact with the input roller are caused to rotate in a direction opposite the input roller, and the first output roller in contact with the loading roller is caused to rotate in the same direction as the input roller, i.e., in a direction opposite the second output roller. In this situation, if a load torque is applied to hinder the first output roller from rotating, a tangential force corresponding to the torque acts between the rolling surface of the first output roller and the rolling surface of the loading roller. This tangential force creates a similar tangential force between the rolling surface of the input roller and the rolling surface of the loading roller. Then, a friction force acting on the loading roller caused by the input roller driving the loading roller and a friction force acting on the loading roller caused by the rolling roller driving the first output roller cause the rolling roller to be pulled in between the input roller and the first output roller.

In order to transmit rotations of the rolling surfaces by friction between the rolling surfaces, a normal force that can create a sufficient friction force to prevent slip between the rolling surfaces is needed. In this drive apparatus, a contact point between the rolling surface of the input roller and that of the loading roller and a contact point between the rolling surface of the loading roller and that of the first output roller are situated on the rolling surface of the loading roller at positions slightly deviated from a diameter line of the loading roller so that when a friction force acting between the rolling surface of the input roller and that of the loading roller and a friction force acting between the rolling surface of the loading roller and that of the first output roller function in a direction that causes the loading roller to be pulled in between the input roller and the first output roller, the friction forces are augmented by wedge effect whereby large normal forces sufficient to prevent slip at these contact points are generated.

The normal force augmented by this wedge effect causes a slight elastic deformation to occur in a normal direction relative to the rolling surface at the respective contact point between the rolling surfaces of the rollers, and the loading roller is slightly shifted such that it squeezes between the input roller and the first output roller and the center axis Z thereof is shifted slightly towards the plane including the axes Y1 and Y2 of the first and second output rollers.

The large normal force applied between the rolling surface of the input roller and that of the loading roller is also applied between the rolling surface of the input roller and that of the second output roller via the input roller. Thus, it is also possible to transmit the rotations by a friction force without causing slip between the rolling surface of the input roller and that of the second output roller. As a result, the driving rollers mounted on the first and second output shafts can friction-drive the tire simultaneously.

At this point, if the input roller stops and the first output roller keeps rotating in the same direction, then the friction force acting between the rolling surface of the first output roller and that of the loading roller reverses its direction and functions to push out the loading roller between the input roller and the first output roller. Accordingly, no wedge effect is produced and large normal force is no longer generated so that slip occurs between the rolling surface of the first output roller and that of the loading roller. Losing the large normal force owing to the wedge effect results in losing the normal force acting between the rolling surface of the input roller and that of the second output roller so that slip also occurs there.

Specifically, when rotations should be transmitted from the input shaft in a certain direction, the wedge effect of the loading roller produces a large normal force between the rolling surfaces to apply a friction force so that it is possible to transmit rotations to the first and second output rollers. When trying to transmit rotations of the same direction from the output shaft, however, the friction force reverses its direction and acts in a direction to push out the loading roller from between the input roller and the first output roller. Consequently, the wedge effect is lost, and a function of a one-way clutch that prohibits transfer of rotations from the first and second output rollers to the input shaft is obtained.

Since the drive apparatus of the invention transmits the drive power by friction, large normal force caused by the wedge effect acts between the rolling surfaces of the input roller, first and second output rollers and loading rollers. Therefore, these rolling surfaces are generally formed from a hard metal that undergoes quenching. A lubricating oil is required to the friction surface in order to enable rolling contact between the hard metal surfaces.

Use of a traction oil that has a traction coefficient, which is a friction coefficient several times as much as a common lubricating oil, is indispensable to transmit a large friction force while rolling. The traction oil demonstrates its high traction coefficient when it is used under a high contact pressure such as 1 GPa or more, which is a value higher by approximately two orders of magnitude when compared with the material (i.e., plastic) of the plastic gear. The highest traction coefficient is obtained when the contact pressure is 1.5 to 2 GPa. This value is substantially the same level as a contact pressure between a bearing ball and a bearing casing under an ordinary operating condition. This value is a reasonable value, which has been sufficiently examined with respect to the quenched bearing steel, and the bearing steel can demonstrate a practically sufficient rolling fatigue life under such operating condition and the life can be predicted to a certain extent.

When the drive apparatus is utilized for a bicycle to electrically assist movements of the bicycle, the input roller, output rollers and loading roller should have a considerably small size to meet the above mentioned high contact pressure condition. Therefore, it is possible to design this drive apparatus to be significantly compact and have greatly elongated life as compared with a conventional drive apparatus including plastic gears. Thus, the size reduction, weight reduction and cost reduction as well as high reliability are all promised.

In order to effectively use the high traction coefficient property with the shearing resistance of the traction oil without causing a large slip when the cylindrical surfaces are in rolling-contact with each other like in this drive apparatus, a ratio of a surface speed difference between the two rolling surfaces to the surface speed, i.e., a creep ratio, being 0.5% or less (normally a creep ratio of about 0.3 to 0.4%) is the most appropriate value. There is no substantial transfer loss at the rolling surface except for this slip. In other words, the transfer loss at the rolling contact between the cylindrical surfaces is 0.5% or less, and is sufficiently smaller than the transfer loss in case of gear-to-gear transfer. Thus, a high power transfer efficiency is obtained.

In this drive apparatus, the bearings supporting the input roller bears little load, and a load acting on the bearing supporting the output roller that supports a large load exerted on the rolling surface is mostly a radial load except for an axial load derived from a small component directed in an axial direction due to a cone angle of a drive surface of the driving roller. A friction torque of the radial ball bearing is extremely smaller as compared with a case where an axial load is exerted. Therefore, a friction loss due to the bearing is small. For this reason also, a high power transfer efficiency is obtained.

In the drive apparatus, the rolling surfaces and other parts/portions adapted to transfer drive power have simple cylindrical surfaces or similar configurations so that they can be machined at high precision and low cost like the roller bearings.

Since the creep ratio is small at the rolling surface which requires a lubricating oil so that heat generation is small and deterioration of the lubricating oil is suppressed. As a result, it is sufficient to supply a trace amount of lubricating oil to the rolling surface. Enough lubricating oil feeding is achieved by simply placing a pad impregnated with the lubricating oil on the rolling surface. The lubricating oil is ensured to have a long life.

Further, since no intermittent contact like the gear meshing does not occur, noises generated by the rolling motion of the cylindrical surfaces are very small, not comparable with noises caused by the gears.

Moreover, the traction oil is confirmed to exhibit a high traction coefficient to a high speed rolling over 10 m/sec so that no problems would arise even if the input roller is caused to rotate at a high speed over 10,000 rpm. In the drive apparatus, the diameter of the input roller's rolling surface is smaller than that of the output roller's rolling surface so that the rotation speed of the input roller can be raised as compared with a case where the output roller is directly driven by the motor. Therefore, a compact, light-weight and high speed motor can be used, and the drive apparatus that is compact, light-weight, easy to mount on a vehicle, has a high power transfer efficiency and is inexpensive is obtained.

The input shaft X of the drive apparatus may extend in the substantially same plane as a plane including the axis Y1 of the first output shaft and the center axis Z of the loading roller.

During operation, friction forces act on the rolling surface of the input roller at a contact point between the input roller's rolling surface and the second output roller's rolling surface and at a contact point between the input roller's rolling surface and the loading roller's rolling surface. If the torque applied to the first output roller is equal to that applied to the second output roller, the friction forces have the same magnitude and the same normal forces act on the two contact points. In this case, the axis X of the input shaft extends in substantially the same plane as the plane including the axis Y2 of the second output shaft and the center line Z of the loading roller so that their normal forces are situated at symmetrical positions on the rolling surface of the input roller along the diameter line of the input roller and counterbalanced each other in principle. Thus, no radial load is exerted on the bearings of the input shaft. Friction forces acting on the input roller are also situated at symmetrical positions on the rolling surface of the input roller along the diameter line and have the same magnitude in opposite directions so that they form a couple. This further proves that no load is exerted on the bearings that support the input shaft.

In actuality, however, a normal force generated at a contact point upon application of a torque causes a mutual approach at the rolling surface and/or bearings so that a position of the center line Z of the loading roller is slightly shifted towards the plane including the axis Y1 of the first output shaft and the axis Y2 of the second output shaft. In addition, it cannot be said that the normal forces and friction forces acting on the two contact points are always exactly the same. A small radial load is therefore exerted on the bearings supporting the input shaft.

If the load exerted on the input shaft has a small value, the rigidity of the input shaft support may be lower than the output shaft so that an overhang structure can be adopted to support the input shaft. Accordingly, a motor shaft itself, which is inserted into the casing from the outside to drive the input shaft, can be used as the input shaft. This contributes to simplification of the drive apparatus structure and cost reduction.

Every other rolling surface of the first output roller, loading roller, input roller and second output roller may have a cylindrical surface, and the remainder may have a crowned cylindrical surface.

When two cylindrical surfaces having parallel axes contact each other and make a line contact, significantly large contact pressures, i.e., edge loads, appear in the vicinity of longitudinal ends of a contact surface. The edge loads promote rolling fatigue of the rolling surface and greatly reduce the life. To prevent the edge load, the cylindrical surface has to have a rounded surface with a large radius of curvature in the axial direction, like the roller bearing. Specifically, the crowning process may be applied to the whole cylindrical surface such that the line contact is changed to a point contact. Alternatively, the crowing may be applied to ends of the cylindrical surfaces such that the contact pressure in the contact area is regulated as much as possible.

By applying such crowing to the rolling surface, it is feasible to prevent the life of the drive apparatus from being reduced significantly from an expected duration.

In general, only one of the two contacting cylindrical surfaces needs to undergo the crowing process to avoid the edge load. In case of four rolling surfaces, therefore, the crowing process is applied to the two non-neighboring rolling surfaces. This contributes to cost reduction when compared with a case where the crowning process is applied to the four rolling surfaces.

A diameter of the rolling surface of the first output roller may be slightly smaller than a diameter of the rolling surface of the second output roller.

When a traction drive is employed, in which the drive power is transferred by a shearing resistance of an oil present between two rolling surfaces, slight creep exists between the rolling surfaces. In order to stably transfer the drive power, the traction oil should be utilized in a so-called proportional zone, in which the traction force increases substantially in proportion to the increasing creep ratio. The creep ratio in this range is approximately 0.5% or less as mentioned earlier.

When the creep exists even if small, and the same torque is applied to the first output roller and the second output roller, the first output roller that transfer the drive power via two contact points in turn will have a larger (summed up) creep ratio than the second output roller that transfers the drive power via a single contact point. Thus, the rotating speed of the first output roller is reduced correspondingly. In other words, if the rotating speed of the first output roller is set to be equal to that of the second output roller under a non-creep condition, a torque applied to the second output roller that is subjected to a smaller creep becomes greater than a torque applied to the first output roller that is subjected to a large creep.

In practice, when the two driving rollers mounted on the first and second output rollers friction-drive the lateral surfaces of the tire, the difference in the torque applied to the two output rollers is more moderated than the creep ratio difference by the elastic deformations at the contact areas between the driving rollers and the rubber tire, but the torque difference unavoidably increases with the increasing torque.

In order to reduce the transferred torque difference between the two output rollers due to the difference in the number of the contact points which the torque passes during transfer, a magnitude of a torque that should transfer the drive power at the maximum efficiency is first determined, and the rotation speed of the first output roller under a non-load condition is set to be slightly faster than that of the second output roller by an amount corresponding to the creep ratio difference, such that the same torque is applied to the two driving rollers when the above determined torque is reached.

By slightly reducing the diameter of the rolling surface of the first output roller than that of the second output roller in correspondence with the creep ratio, the difference in torque applied to the two output rollers is reduced.

Two loading rollers may be provided between the input shaft and the first output shaft such that they may be arranged in tandem, and center axes of these loading rollers may be spaced in opposite directions from the plane including the axis Y1 of the first output shaft and the axis Y2 of the second output shaft and may extend in parallel to the input and first and second output shafts.

A welfare-specific vehicle such as an electrically driven wheel chair should be able to move forward and backward. Thus, the function of the one-way is unnecessary. In order to apply an appropriate normal force between the input roller or output roll and the loading rollers on one hand and to transfer a torque to cause rotations of forward and backward directions on the other hand, the two loading rollers are needed to work in relation to the forward rotation torque and the backward rotation torque respectively.

This function is realized by arranging the two loading rollers on the opposite sides of the plane including the axes Y1 and Y2 of the two output shafts such that the two loading rollers produce the wedge effect with the oppositely directed torques.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 illustrates relationship among forces acting on an input roller when the drive apparatus shown in FIG. 1 transmits the drive power;

FIG. 7 illustrates relationship among forces acting on a loading roller when the drive apparatus shown in FIG. 1 transmits drive power;

FIG. 8 illustrates a cross sectional view of a parallel dual-shaft drive apparatus according to a second embodiment of the present invention, cut in a direction perpendicular to the shaft;

FIG. 12 illustrates a shape of a contact surface and contact pressure distribution when two cylindrical rollers contact each other;

FIG. 13 illustrates the contact surface shape and contact pressure distribution when a roller having an arcuate crowned surface and a cylindrical roller contact each other;

FIG. 14 illustrates the contact surface shape and contact pressure distribution when a roller having an ideal crowned surface and a cylindrical roller contact each other;

FIG. 15 illustrates a cross sectional view of a parallel dual-shaft drive apparatus according to a fourth embodiment of the present invention, taken in a direction perpendicular to the shaft;

FIG. 16 illustrates a cross sectional view of a parallel dual-shaft drive apparatus according to a fifth embodiment of the present invention, taken in a plane including the two output shafts; and FIG. 17 illustrates a cross sectional view of the drive apparatus shown in FIG. 16, taken in a direction perpendicular to the shaft.

DETAILED DESCRIPTION OF THE PREFERRED EMBODIMENTS

Embodiments of the present invention will now be described in reference to the accompanying drawings.

Figure 1:
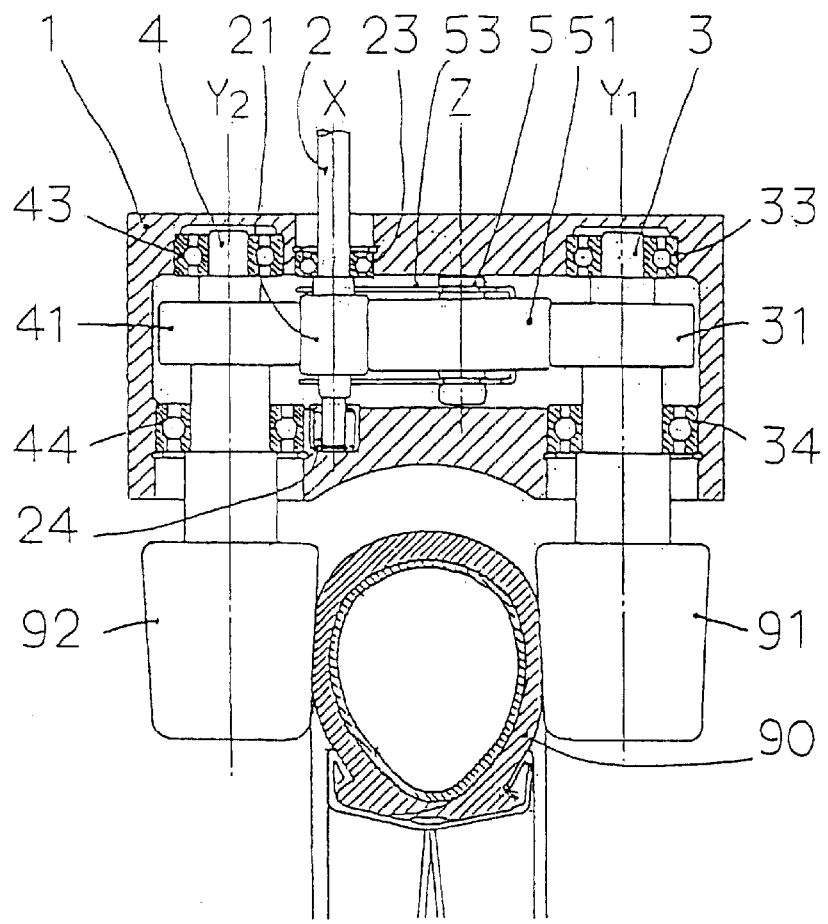
FIG. 1 illustrates a cross sectional view of a parallel dual-shaft drive apparatus according to a first embodiment of the present invention, taken along a plane including two output shafts of the apparatus.
Figure 2:
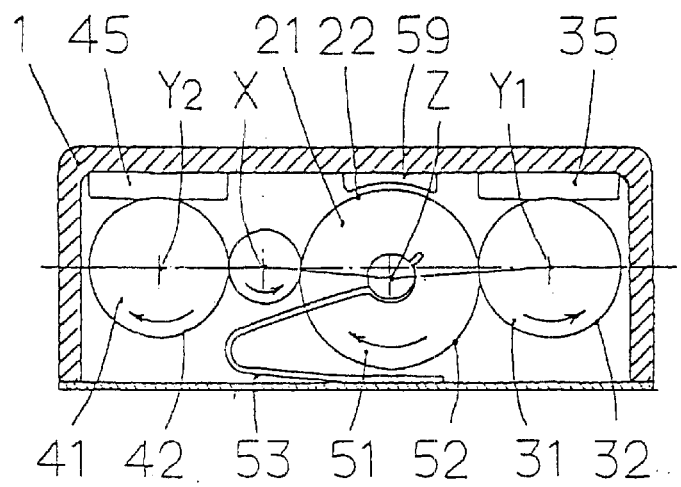
FIG. 2 illustrates a cross sectional view of the drive apparatus shown in FIG. 1, cut in a direction perpendicular to the dual-shaft.

Referring to FIGS. 1 and 2, illustrated is a first embodiment of the present invention. In this embodiment, an axial line X of an input shaft 2, an axial line Y1 of a first output shaft 3 and an axial line Y2 of a second output shaft 4 are on the same plane. These shafts are supported in an outer casing 1 by bearings 23, 24, 33, 34, 43 and 44 respectively. Between the input shaft 2 and first output shaft 3, provided is a loading roller shaft 5 of which axial line Z is slightly spaced from the plane of the axial lines Y1 and Y2 and extends in parallel to these axial lines Y1 and Y2.

Figure 3:
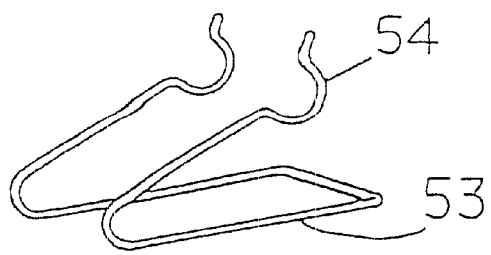
FIG. 3 illustrates an exemplary shape of a preload spring used in the drive apparatus shown in FIG. 1.

The input shaft 2, first output shaft 3, second output shaft 4 and loading roller shaft 5 have an input roller 21, first output roller 31, second output roller 41 and loading roller 51 respectively. Outer peripheral surfaces of these rollers define substantially cylindrical rolling surfaces 22, 32, 42 and 52 respectively. The loading roller 51 is slightly preloaded toward a plane including the axes Y1 and Y2 by a preload spring 53, an example of which is shown in FIG. 3, such that each two adjacent rolling surfaces of the shafts 2 to 5 contact each other. Here, the preload spring 53 also serves as means for supporting the loading roller 51. Although not illustrated, a roller bearing may be located between the loading roller and the loading roller shaft.

In this embodiment, grooves are formed in the loading roller shaft and free end portions 54 of the preload spring 53 are bent such that the free end portions 54 are fitted in the grooves of the loading roller shaft and extend in the grooves 180 degrees or more in the circumferential direction of the loading shaft, whereby the loading roller shaft does not come off from the free end portions of the preload spring 53. This makes it possible to handle the loading roller and presser roller as a single united part so that an assembling operation of the drive apparatus is simplified.

Between the first output roller surface 32 and the casing 1, provided is an oil pad 35 which contacts the rolling surface 32 to feed a lubricating oil. Likewise, an oil pad 45 is situated between the second output roller surface 42 and the casing 1 such that it contacts and feeds the lubricating oil to the rolling surface 42.

A loading roller stopper 59 is placed between the loading roller 51 and the casing 1 on the side opposite the preload spring 53.

The first and second output shafts 3 and 4 have driving rollers 91 at respective one ends thereof to friction drive a tire 90.

When the input shaft 2 rotates counterclockwise in FIG. 2, the loading roller 51 in contact with the input roller 21 is caused to rotate clockwise by a friction force generated between the input roller surface 22 and the loading roller surface 52, and the first output roller 31 in contact with the loading roller 51 is caused to rotate counterclockwise (i.e., a direction opposite the loading roller 51) by a friction force generated between the loading roller surface 52 and the first output roller surface 32. The second output roller 41 in contact with the input roller 21 is caused to rotate clockwise (i.e., a direction opposite the input roller, or a direction opposite the first output roller 31) by a friction force produced between the input roller surface 22 and the second output roller surface 42.

Figure 4:
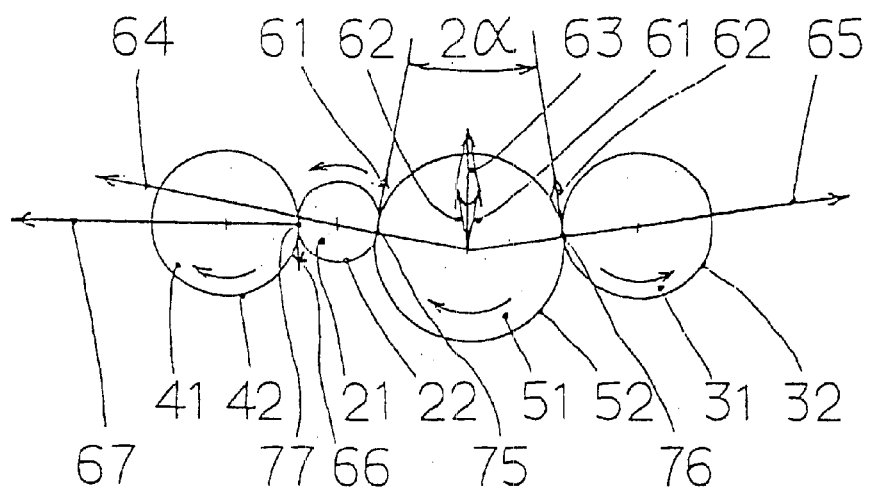
FIG. 4 illustrates relationship among forces when the drive apparatus shown in FIG. 1 transmits drive power.

At this point, if a torque is applied to the first output shaft 3 to hinder the rotation of the first output shaft, a friction force 62 corresponding to the torque is generated between the first output roller surface 32 and the loading roller surface 52 as shown in FIG. 4. This friction force 62 generates a friction force 61 of the same magnitude between the input roller surface 22 and the loading roller surface 52.

A resultant force of the input shaft's friction force 61 driving the loading roller and the first loading roller's friction force 62 generated by the resisting first output roller functions in a direction pulling in the loading roller between the input roller and the first output roller.

Since a contact point 75 between the input roller surface 22 and the loading roller surface 52 and a contact point 76 between the loading roller surface 52 and the first output roller surface 32 are positioned close to a diameter line of the loading roller, normal forces 64 and 65 (referred to as "Fn" below) acting on the contact points 75 and 76 are augmented by wedge effect and can be expressed by the following equation:

$$Fn=Ft/\tan\alpha$$

where an angle between a tangent line from the contact point 75 and that from the contact point 76 is represented by 2°, and the friction forces 61 and 62 at the contact points 75 and 76 are represented by Ft.

If $Ft/Fn\leq\mu$ is met where $\mu$ is a maximum value of a traction coefficient of a traction oil in use, i.e., if $\mu\geq\tan\alpha$, then large creep does not occur at the contact points. It is therefore possible to transfer the drive power with slight creep.

The normal force 64 acting on the contact point 75 is transferred to a contact point 77 between the input roller surface 22 and the second output roller surface 42 via the input roller and functions as a normal force 67, and a friction force 66 is produced by a torque exerted on the driving roller. Therefore, it is also feasible to transmit the drive power with slight slip at the contact point 77. It should be noted that for the sake of clarity and easier understanding the direction of the normal force 67 is reversed 180 degrees relative to the contact point 77 in FIG. 4.

Figure 5:
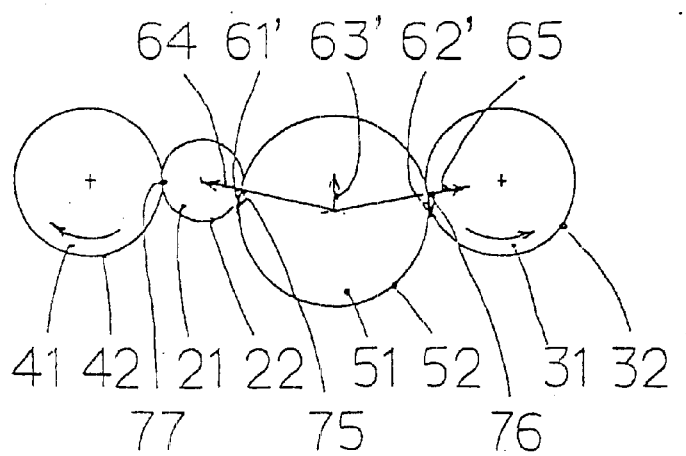
FIG. 5 illustrates relationship among forces when the drive apparatus shown in FIG. 1 does not transmit the drive power.

If the peripheral speed of the output roller surface 32 is faster than that of the input roller surface 22 under the same condition regarding the rotation directions of the respective rollers, small normal forces 64 and 65 resulting from augmentation of a weak preload 63' of the preload spring 53 by wedge effect act on the contact points 75 and 76 respectively as illustrated in FIG. 5. Friction forces 61' and 62' of the inverted direction are also generated in the loading roller. These friction forces 61' and 62' act in a direction to push in the loading roller 51 between the input roller 21 and the first output roller 31 so that they counterbalance the preload 63' of the preload spring 53, i.e., a force urged between the input roller 21 and the first output roller 31. Accordingly, the normal forces on the contact points 75 and 76 become very small, and the first output roller 31 cannot drive the input roller surface 22. If no normal forces act on the contact points 75 and 76, the normal force 67 at the contact point 77 between the input roller surface 22 and the second output roller surface 42 becomes zero, and it is no longer possible to friction drive the input roller surface 22.

As described above, it is possible to rotate the first output roller 31 counterclockwise and the second output roller 41 clockwise by rotating the input roller 21 counterclockwise, but it is not possible to rotate the input roller 21 by the output rollers 31 and 41 even if the output rollers are caused to rotate in the same way. This is an overrunning clutch function, which is one of features of a one way clutch.

Further, when the input roller 21 is not driven by an external drive, the first output roller 31 rotates counterclockwise and the second output roller 41 rotates clockwise, then the input roller 21 does not rotate. On the other hand, when the first output roller 31 rotates clockwise and the second output roller 41 rotates counterclockwise, then the input roller 31 rotates clockwise. Thus, a function of a one way clutch is obtained again.

Consequently, if the present embodiment is employed in a bicycle equipped with an electrical drive as an assisting device, the input shaft 2 is rotated counterclockwise by a motor so as to rotate a tire in a forward direction by the driving rollers 91 and 92 attached to the two output rollers. When, on the other hand, the motor is deactivated and the tire is rotated in the forward direction by inertia or hands, the input roller (i.e., motor) is not rotated. When the bicycle is moved backwards, the motor is activated by the output roller.

A mechanism for separating the loading roller from the input and output rollers against the biasing force of the preload spring 53 may be additionally provided such that the motor will not be driven when the bicycle moves backwards.

The normal force 65 and the friction force 62 which is smaller than the normal force 65 act on the contact point 76 between the first output roller surface 32 and the loading roller surface 52, and the resultant force of these two forces is supported by bearings 33 and 34. Likewise, the normal force 67 and the friction force 66 smaller than the normal force 67 act on the contact point 77 between the second output roller surface 42 and the input roller surface 22, and the resultant force of these two forces is supported by bearings 43 and 44.

Referring to FIG. 6, a resultant force 68 of the normal force 64 and the friction force 61 acts on the contact point 75 of the input roller surface 22 with the loading roller surface 52, and a resultant force 69 of the normal force 67 and the friction force 66 acts on the contact point 77 of the input roller surface 22 with the second output roller surface 42, but these resultant forces 68 and 69 are mostly counterbalanced by each other since the contact points 75 and 77 are positioned close to the input roller's diameter line, and a small resultant force 70 remaining due to a difference in directions of the resultant forces 68 and 69 is exerted on the bearing 23 and 24 of the input shaft in a radial direction. It should be noted that for the sake of clarity and easier understanding the directions of the normal forces 64 and 67, the friction forces 61 and 66 and the resultant forces 68 and 69 acting on the contact points 75 and 77 are reversed 180 degrees relative to the contact points 75 and 77 in this drawing.

As shown in FIG. 7, the friction force 61 caused by the normal force 64 and the friction force 62 caused by the normal force 65 act at the contact points 75 and 76 on the rolling surface 52 of the loading roller respectively, and the contact points are positioned close to the diameter line of the loading roller. In addition, the pushing forces 71 and 72 are also produced at these contact points by the normal forces 64 and 65 to push out the loading roller from between the input roller surface and the first output roller surface. The friction force 61, 62 is $\mu$ times the associated normal force, and the pushing force 71, 72 is tan $\alpha$ times the normal force. Since $\mu \geq \tan \alpha$, the resultant force 63 is greater than the resultant force 73 and the difference between these resultant forces functions to pull in the loading roller between the input roller surface and the first output roller surface so that the loading roller is supported between the input roller surface and the first output roller surface. As a result, it is unnecessary to accurately support the loading roller by bearings or the like. In other words, simply supporting the position of the loading roller with the preload spring 53 of a light supporting force is sufficient, and no special supporting measures are required.

On the opposite side of the loading roller 51 with respect to the preload spring, a loading roller stopper 59 is located between the loading roller 51 and the outer casing 1. When a torque is applied onto this drive apparatus, normal forces are generated in accordance with the torque at the contact points 75, 76 and 77 between the input roller, loading roller and output roller, and these normal forces cause mutual approach between the respective contact surfaces. Mutual approach is also produced in the bearings 33, 34, 43 and 44 that support these normal forces, and deflections occur in the output shafts 3 and 4. Such mutual approach and deflections cause the loading roller to squeeze between the input roller and the first output roller so that the angle 2 $\alpha$ becomes smaller. When the torque exceeds a certain limit, components 71 and 72 of the normal forces that tend to push out the loading roller from between the input roller and the first output roller suddenly drops below the torque-derived forces 61 and 62 that tend to push in the loading roller between the input roller and the first output roller. As a result, the center of the loading roller moves across the plane including the axes Y1 and Y2 of the two output shafts and reaches the opposite side. This disables further torque transfer. By providing the loading roller stopper 59 between the loading roller and the outer casing, the loading roller does not overpass the Y1–Y2 plane, and therefore it is possible to prevent occurrence of the above described torque-transfer-disabled condition, which would be caused by an instantaneous large torque that is possibly experienced during driving of a vehicle due to, for example, the vehicle's riding on a curbstone.

Oil pads 35 and 45 made of felt and impregnated with a lubricating oil are located in contact with the rolling surfaces 32 and 42 of the first and second output rollers. When drive power is transmitted by the rolling between the cylindrical surfaces, an extremely thin lubricating film is formed on the rolling surfaces so that a creep ratio is small, temperature rise is small and the lubricating oil degradation is small. Consequently, a small amount of lubricating oil impregnated in the oil pad is sufficient to insure proper longevity. Since a small amount of lubricating oil is enough, a large space in the outer casing is occupied by the air. Further, the temperature rise of the outer casing is small because the power transfer loss of the power transfer device is small. Accordingly, the atmosphere temperature and sunshine do not raise the inner pressure very much, and inconveniences such as oil leakage do not occur.

All the parts have a cylindrical shape except for the outer casing 1 and the preload spring 53 so that they are easy to fabricate. In addition, if the input roller, output roller and loading roller that require quenching hardness and high precision machining have a ring shape and are separated from the shafts such that these rollers are later assembled with the shafts by fitting, then a machining and assembling technique established for mass production of the roller bearings can be employed for easier and less costly manufacturing of the roller-shaft assemblies. The outer casing 1 is made by an aluminum die casting process, followed by a small cutting process. The preload spring 3 can be prepared by simply bending a piano wire. Therefore, the manufacturing cost can greatly be suppressed.

Referring now to FIG. 8, illustrated is a second embodiment of the present invention. In this embodiment, the axis X of the input shaft is substantially coplanar to the axis Y2 of the second output shaft and the axis Z of the loading roller shaft.

Figure 9:
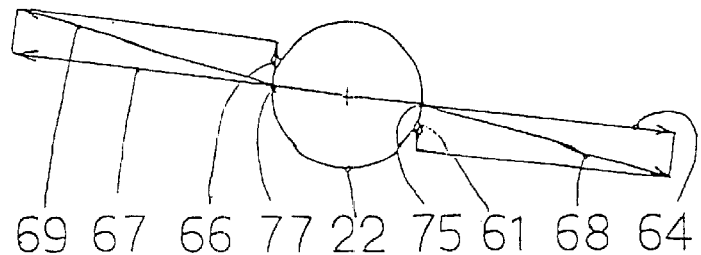
FIG. 9 is a diagram showing relationship among forces acting on an input roller when the drive apparatus shown in FIG. 8 transfers the drive power.
Figure 10:
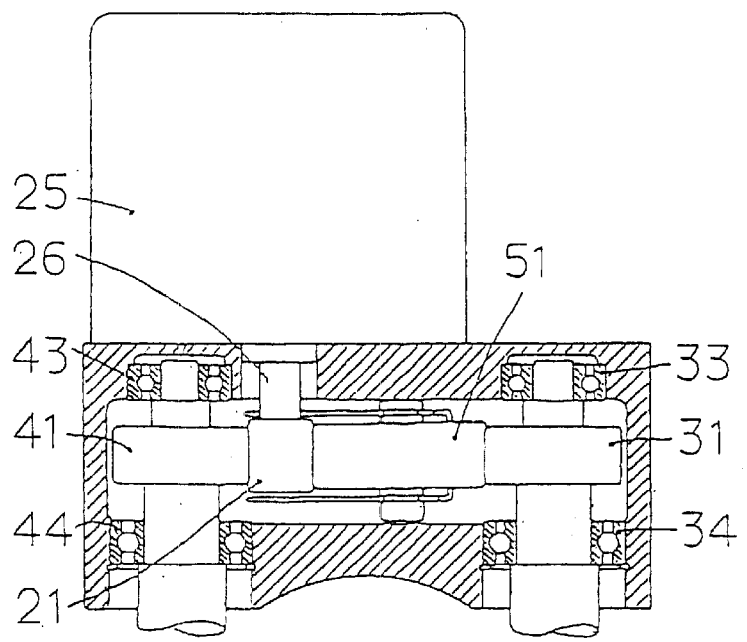
FIG. 10 illustrates a cross sectional view of the drive apparatus shown in FIG. 8 when an output shaft of a motor is utilized as an input shaft, taken along a plane including two output shafts.

In this arrangement, as the torque to be transmitted increases, the loading roller 51 is slightly shifted in a direction squeezing between the input roller 21 and the first output roller 31. Thus, the contact point 75 changes its position to a certain extent. As illustrated in FIG. 9, however, the contact points 75 and 77 are situated on the input roller surface at substantially opposite positions close to the diameter line of the input roller, the normal forces 64 and 67 have the same magnitude in opposite directions so that they counterbalance each other, and the friction forces 61 and 66 acting on the contact points 75 and 77 form a couple, so that little load is exerted on the bearings 23 and 24 supporting the input roller. Accordingly, as shown in FIG. 10, it is possible to dispense with the bearings 23 and 24 supporting the input roller. In such a case, the output shaft 26 of the motor 25 adapted to drive the input shaft is directly utilized as the input shaft, i.e., a simple cantilever arrangement will be employed. It should be noted that for the sake of easier illustration the directions of the normal forces 64 and 67, the friction forces 61 and 66 and the resultant forces 68 and 69 are inverted 180 degrees relative to the contact points 75 and 77 in FIG. 9, like in FIG. 7.

Figure 11:
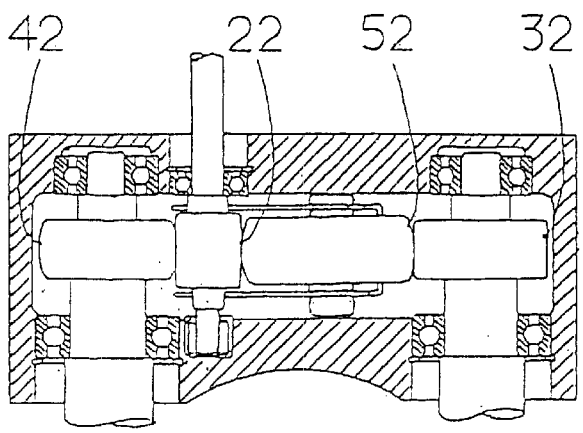
FIG. 11 illustrates a cross sectional view of a parallel dual-shaft drive apparatus according to a third embodiment of the present invention, taken along a plane including two output shafts.

FIG. 11 illustrates a third embodiment. The rolling surfaces 42 and 52 of the second output roller and loading roller have a crowned cylindrical surface. In this drawing, the crowning is depicted in an exaggerated manner.

As shown in FIG. 12, when the two cylindrical surfaces 55 and 56 supported in parallel contact each other and bear a load, they create a line contact and have a contact pressure distribution 82 that has a larger surface pressure (i.e., edge load) at ends of a contact surface 81. Thus, when the surfaces 55 and 56 roll in contact with each other, a fatigue failure occurs from the ends of the surfaces, which are subjected to the larger surface pressure.

As depicted in FIG. 13, if one of the rolling surfaces 57 has an arcuate surface with a large radius of curvature in the axial direction, the contact between the two surfaces 55 and 57 becomes a point contact, the contact surface 83 becomes an oval, and the contact pressure distribution 84 becomes a semi-oval without edge loads. This can prevent significant reduction of the rolling fatigue life. By appropriately selecting the radius of curvature of the arcuate surface, the plane pressure at the contact surface can be set to a desired value relative to the fatigue light and traction property of the lubrication oil.

As illustrated in FIG. 14, moreover, if one of the rolling surfaces 58 is shaped to an ideal crown such that the contact surface pressure is substantially constant in the axial direction of the cylindrical surface, both of the contact surface 85 and contact pressure distribution 86 have an approximately rectangular shape, and the rollers enjoy the longest life.

It should be noted that it is sufficient to apply the crowning to one of the two contacting cylindrical surfaces. Thus, every other rolling surfaces of the second output roller, input roller, loading roller and first output roller may be crowned.

Referring to FIG. 15, illustrated is a fourth embodiment of the present invention. The rolling surface 32 of the first output roller has a diameter D1 slightly smaller than the diameter D2 of the rolling surface 42 of the second output roller. In this illustration, the diameter difference is exaggerated.

The rolling surface 42 of the second output roller is directly driven via the contact point 77 with the rolling surface 22 of the input roller, and the rolling surface 32 of the first output roller is driven via two contact points, namely the contact point 75 between the rolling surface 22 of the input roller and the rolling surface 52 of the loading roller, and the contact point 76 between the rolling surface 52 of the loading roller and the rolling surface 32 of the first output roller.

Consequently, if the two output rollers' rolling surfaces 32 and 42 have the same diameter and the first and second output rollers 31 and 41 have the same rotating speed without slippage under a non-load condition, then the rotation speed of the first output roller driven via the two contact points becomes slower than the rotation speed of the second output roller driven via the single contact point as the torque increases. This is because slight slippage occurs and increases with the increasing torque.

In this embodiment, therefore, the diameter of the rolling surface 32 of the first output roller is made slightly smaller than that of the rolling surface 42 of the second output roller so that the rotation speed of the first output roller is raised relatively. This results in an advantage that the difference in the torque transmitted to the two driving rollers caused by the slight slip upon application of the torque is reduced.

FIGS. 16 and 17 illustrate a fifth embodiment of the present invention. Two loading rollers 51 and 51' are located between the input roller 21 and the first output roller 31, and supported at opposite deviated positions with respect to the plane including the two output shafts' axes Y1 and Y2 such that the rollers 51 and 51' mostly overlap if viewed in the axial direction. These loading rollers are supported in parallel to the input and output shafts, and preloaded by respective preload springs 53 and 53' such that they squeeze between the rolling surface 22 of the input roller and the rolling surface 32 of the first output roller.

When the input shaft 21 rotates counterclockwise for transmission of its rotations, a resulting friction force causes the first loading roller 51 to squeeze between the input roller and the first output roller so as to transmit the torque, but the second loading roller 51' is slightly moved in a push-out direction from between the input roller and the first output roller so that it does not contribute to torque transmission.

When the input shaft 21 rotates clockwise for transmission of the rotations, on the other hand, the friction force causes the second loading roller 51' to squeeze between the input roller and the first output roller and transmits the torque whereas the first loading roller 51 does not contribute to torque transmission.

In this manner, normal forces are generated on the respective rolling surfaces in accordance with the torques so that it is always possible to transmit the rotations of the input shaft in either direction while maintaining a high power transfer efficiency.

As understood from the foregoing, the present invention can provide a compact and light-weight drive apparatus that has a high power transfer efficiency, does not produce noises unlike an arrangement including gears, and possesses a function of a one-way clutch.

Further, the drive apparatus of the invention can reduce possibilities of troubles such as oil leakage, facilitate maintenance, and be designed using the technique generally applied to the roller bearings when predicting the fatigue life of the rolling surfaces that transmit the drive power. Of course the same technique is applicable to the roller bearing that support the input and output rollers. Therefore, the drive apparatus of the invention has high reliability.

Moreover, most of the major parts have a cylindrical shape or combination of cylindrical shapes, and strength and finished surface accuracy required to the rolling and transmission portions are substantially the same as the roller bearings. Therefore, these parts and portions can be fabricated using the same material, heat treatment and machining technique as the roller bearings in an easy and inexpensive way. Consequently, the cost of the drive apparatus is reduced.

Still further, since the rotating speed higher than the conventional arrangement enables use of a compact, light-weight and inexpensive motor, it is feasible to greatly reduce the weight and cost. The drive apparatus including such a motor is also compact and light-weight so that it is possible to install the drive apparatus in a wide variety of vehicles.

In addition, since a radial load exerted on the input shaft is small and an overhang structure can be adopted to support the input shaft, the shaft of the motor driving the input shaft can directly be used as the input shaft thereby simplifying the structure and reducing the size, weight and cost.

By providing two pairs of the loading roller and preload spring for normal and reverse rotations respectively, the function of the one-way clutch may be removed and the rotations and torque in both directions may be transmitted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.2000-246524 filed on Jul. 12, 2000 including the specification, claims, drawings and summary is incorporated herein by reference in its entirety.

What is claimed is:

1. A parallel dual-shaft drive apparatus comprising:

an input shaft having an input roller, an outer peripheral surface of the input roller being a substantially cylindrical rolling surface;

a first and second output shafts extending in parallel to the input shaft such that the input shaft extends between the first and second output shafts in a substantially same plane as a plane including the first and second output shafts, each of the first and second output shafts having an output roller, and an outer peripheral surface of each output roller being a substantially cylindrical rolling surface;

a casing for supporting the input and first and second output shafts via bearings; and a loading roller extending between the input roller and the first output roller such that a center axis of the loading roller is slightly spaced from the plane including the first and second output shafts and extends in parallel to the input and first and second output shafts, an outer peripheral surface of the loading roller being a substantially cylindrical rolling surface, wherein the rolling surface of the input roller is positioned adjacent to the rolling surface of the second output roller, the rolling surface of the loading roller is in rolling-contact with the rolling surface of the input roller and the rolling surface of the first output roller, and the loading roller is supported inside the casing such that it is preloaded towards the casing by a preload spring which gives a force to the rolling surface of the loading roller to contact the rolling surface of the input roller and the rolling surface of the first output roller.

2. The parallel dual-shaft drive apparatus according to claim 1, wherein the input shaft extends in a substantially same plane as a plane including the second output shaft and the center axis of the loading roller.

3. The parallel dual-shaft drive apparatus according to claim 1, wherein every other rolling surface of the first output roller, loading roller, input roller and second output roller have a cylindrical surface, and the remainder have a crowned cylindrical surface.

4. The parallel dual-shaft drive apparatus according to claim 1, wherein a diameter of the rolling surface of the first output roller is slightly smaller than a diameter of the rolling surface of the second output roller.

5. The parallel dual-shaft drive apparatus according to claim 1, wherein two loading rollers are located in tandem between the input shaft and the first output shaft, center axes of the two loading rollers are spaced in opposite directions from the plane including the first and second output shafts and extend in parallel to the input and first and second output shafts.

6. The parallel dual-shaft drive apparatus according to claim 1, wherein the input shaft extends in a plane which is substantially same as a plane including the second output shaft and the center axis of the loading shaft.

* * * * *